United States Patent
Son et al.

(10) Patent No.: US 7,832,083 B2
(45) Date of Patent: Nov. 16, 2010

(54) SHIPPING COMB USABLE WITH A HEAD STACK

(75) Inventors: Jung-moo Son, Gunpo-si (KR); Ji-ho Hwang, Yeosu-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 658 days.

(21) Appl. No.: 11/621,677

(22) Filed: Jan. 10, 2007

(65) Prior Publication Data

US 2007/0163105 A1    Jul. 19, 2007

(30) Foreign Application Priority Data

Jan. 13, 2006   (KR) .................. 10-2006-0003965

(51) Int. Cl.
G11B 5/127      (2006.01)
G11B 5/012      (2006.01)

(52) U.S. Cl. ............. 29/603.03; 29/603.02; 29/603.05; 29/729; 29/739; 360/97.01

(58) Field of Classification Search ............ 29/729, 29/739, 732, 735, 503.01, 603.02, 603.04, 29/603.05; 360/254.3, 254.4, 254.7, 266.1, 360/265.2, 264.2, 97.01
See application file for complete search history.

(56) References Cited

U.S. PATENT DOCUMENTS

| 5,482,164 | A | | 1/1996 | Karns | |
|---|---|---|---|---|---|
| 5,826,325 | A | * | 10/1998 | Price et al. | 29/603.03 |
| 5,831,795 | A | * | 11/1998 | Ma et al. | 360/254.3 |
| 5,984,104 | A | * | 11/1999 | Schott et al. | 206/728 |
| 6,069,773 | A | * | 5/2000 | Frater et al. | 360/245.7 |
| 6,452,753 | B1 | * | 9/2002 | Hiller et al. | 360/254.7 |
| 6,687,093 | B1 | | 2/2004 | Butler et al. | |
| 7,159,299 | B1 | * | 1/2007 | McMunigal et al. | 29/603.03 |
| 2006/0117558 | A1 | * | 6/2006 | Koh et al. | 29/737 |

* cited by examiner

*Primary Examiner*—Derris H Banks
*Assistant Examiner*—Tai Nguyen
(74) *Attorney, Agent, or Firm*—Stanzione & Kim LLP

(57) ABSTRACT

A shipping comb combined with a head stack assembly (HSA) which includes sliders recording data onto or reading data from disks, suspensions having the sliders thereon, and end-taps at front ends of the suspensions, the shipping comb preventing the HSA from being damaged, the shipping comb including a body unit having protruding suspension spacers which are each inserted between middle portions of a pair of suspensions having a pair of sliders facing each other to prevent a collision of the middle portions of the pair of suspensions, and a head unit having protruding end-tap spacers inserted between the end-taps of the pair of the suspensions to prevent a collision of the front ends of the pair of suspensions, and connected to a front end of the body unit with a hinge.

6 Claims, 4 Drawing Sheets

SHIPPING COMB USABLE WITH A HEAD STACK

CROSS-REFERENCE TO RELATED APPLICATIONS

This application claims the benefit of Korean Patent Application No. 10-2006-0003965, filed on Jan. 13, 2006, in the Korean Intellectual Property Office, the disclosure of which is incorporated herein in its entirety by reference.

BACKGROUND OF THE INVENTION

1. Field of the Invention

The present general inventive concept relates to a hard disks drive, and more particularly, to a shipping comb that is combined with a head stack assembly (HSA) to prevent damage of the HSA.

2. Description of the Related Art

Among data storage apparatuses used in computers, a hard disk drive (HDD) records/reproduces data on/from disks using magnetic heads. A head stack assembly (HSA) supports the magnetic heads to move above the disks and is installed in a base member of the HDD. The HSA is connected to a protecting member, that is, a shipping comb, which prevents the HSA from being damaged when the HSA is handled or mounted in the base member. FIG. 1 is a perspective view illustrating a conventional shipping comb 10 and a head stack assembly (HSA) 5 supported by the shipping comb 10.

Referring to FIG. 1, the shipping comb 10 includes suspension spacers 12 disposed between middle portions of suspensions 7 in the HSA 5, and end-tap spacers 14 inserted between end-taps 8 disposed at front ends of the suspensions 7. The suspension spacers 12 separate the middle portions of the suspensions 7 not to collide with each other. The end-tap spacers 14 separate the front ends of the suspensions 7 not to collide with each other. Since the shipping comb 10 includes the end-tap spacers 14, the collision of sliders 9 disposed at the front ends of the suspensions 7 can be prevented even when relatively large impact or vibration forces are applied to the HSA 5. Accordingly, the shipping comb 10 is useful especially when the HSA 5 is carried.

Additionally, HSAs 5 manufactured by automated manufacturing processes undergo physical standard measurement tests and electric function tests. The shipping comb 10 which is combined with the HSA 5 prevents the HSA 5 from being damaged during the measurement and electric function tests. However, the end-tap spacers 14 of the shipping comb 10 cover the sliders 9 mounted at the front ends of the suspensions 7 so that measurement and testing of the HSA 5 becomes difficult.

After a manufacturing process is complete, HDDs sequentially undergo a servo write, a function test, a burn-in test, and a final test. The HDDs are then are delivered to retailers. When an HDD fails to pass the sequential tests, defective portions of the HDD are replaced, and then the HDD is re-delivered to retailers, thereby reducing waste of resources. A process of replacing defective portions in a defective HDD is called re-work. When the HSA 5 is defective, the re-work of the HSA 5 becomes difficult due to the shipping comb 10. The end-tap spacers 14 of the shipping comb 10 cannot progress due to a ramp standing in the way of the end-tap spacer 14. Therefore, the shipping comb 10 cannot be combined with the HSA 5 which is mounted on a base member (not illustrated) of the HDD and supported by the ramp.

Therefore, the use of the shipping comb 10 is limited, and a shipping comb having an improved structure is needed.

SUMMARY OF THE INVENTION

The present general inventive concept provides a shipping comb that allows physical standard measurements and electric function tests to be performed on a head stack assembly (HSA) with ease.

The present general inventive concept also provides a shipping comb that allows a defective HSA to be easily re-worked.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a shipping comb combined with a head stack assembly (HSA) having sliders recording data onto or reading data from disks, suspensions having the sliders thereon, and end-taps at front ends of the suspensions, the shipping comb preventing the HSA from being damaged, the shipping comb including a body unit having protruding suspension spacers which are each inserted between middle portions of a pair of suspensions having a pair of sliders facing each other to prevent a collision of the middle portions of the pair of suspensions, and a head unit having protruding end-tap spacers inserted between the end-taps of the pair of the suspensions to prevent a collision of the front ends of the pair of suspensions, and connected to a front end of the body unit with a hinge.

The head unit may rotate around the hinge to a predetermined angle with respect to the body unit so that the head unit reaches a first position where the end-tap spacers are inserted between the end-taps or a second position where the end-tap spacers are not inserted between the end-taps.

The shipping comb may further include limiters to limit a rotation angle of the head unit with respect to the body unit.

The shipping comb may further include at least a pair of the suspension spacers and a pair of the end-tap spacers corresponding to the HSA which includes at least two pairs of the suspensions.

The head unit may frictionally contact the body unit at the hinge so as not to rotate due to its own weight with respect to the body unit.

The foregoing and/or other aspects of the present general inventive concept are achieved by providing a shipping comb usable with a head stack assembly, the shipping comb including a body unit having an elongated shape with first support protrusions extending from a midsection thereof and second spacing protrusions extending from an end thereof, and a head unit rotatably coupled to the body unit adjacent to the second spacing protrusions at a first end thereof and having third spacing protrusions extending from a second end thereof such that the head unit and the third spacing protrusions are rotatable together with respect to the body unit, the first support protrusions, and the second spacing protrusions.

The foregoing and/or other aspects of the present general inventive concept are also achieved by providing a shipping comb assembly, including a head stack assembly having a VCM coil, a swing arm extending from the VCM coil along a predetermined direction, a plurality of suspensions extending from the swing arm along the predetermined direction, and a plurality of sliders disposed on ends of the suspensions, and a shipping comb having a body unit extending along the VCM coil and the swing arm in the predetermined direction and being coupled thereto, a hinge having a rotating axis that is perpendicular to the predetermined direction, and a head unit rotatably connected to the body unit via the hinge and having a plurality of spacing protrusions that are movable to/from the suspensions.

The foregoing and/or other aspects of the present general inventive concept are also achieved by providing a hard disk drive, including a base member, a spindle motor disposed on the base member to rotate one or more disks, a head stack assembly disposed on the base member adjacent to the disks and having a VCM coil, a swing arm extending from the VCM coil along a predetermined direction, a plurality of suspensions extending from the swing arm along the predetermined direction, and a plurality of sliders disposed on ends of the suspensions, a ramp disposed at a side portion of the base member along which the sliders are movable, and a shipping comb having a body unit extending along the VCM coil and the swing arm in the predetermined direction and being coupled to the swing arm, a hinge having a rotating axis that is perpendicular to the predetermined direction, and a head unit rotatably connected to the body unit via the hinge and having a plurality of spacing protrusions that are movable to/from the suspensions such that the head unit is movable to prevent the spacing protrusions from interfering with the movement of the sliders along the ramp.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
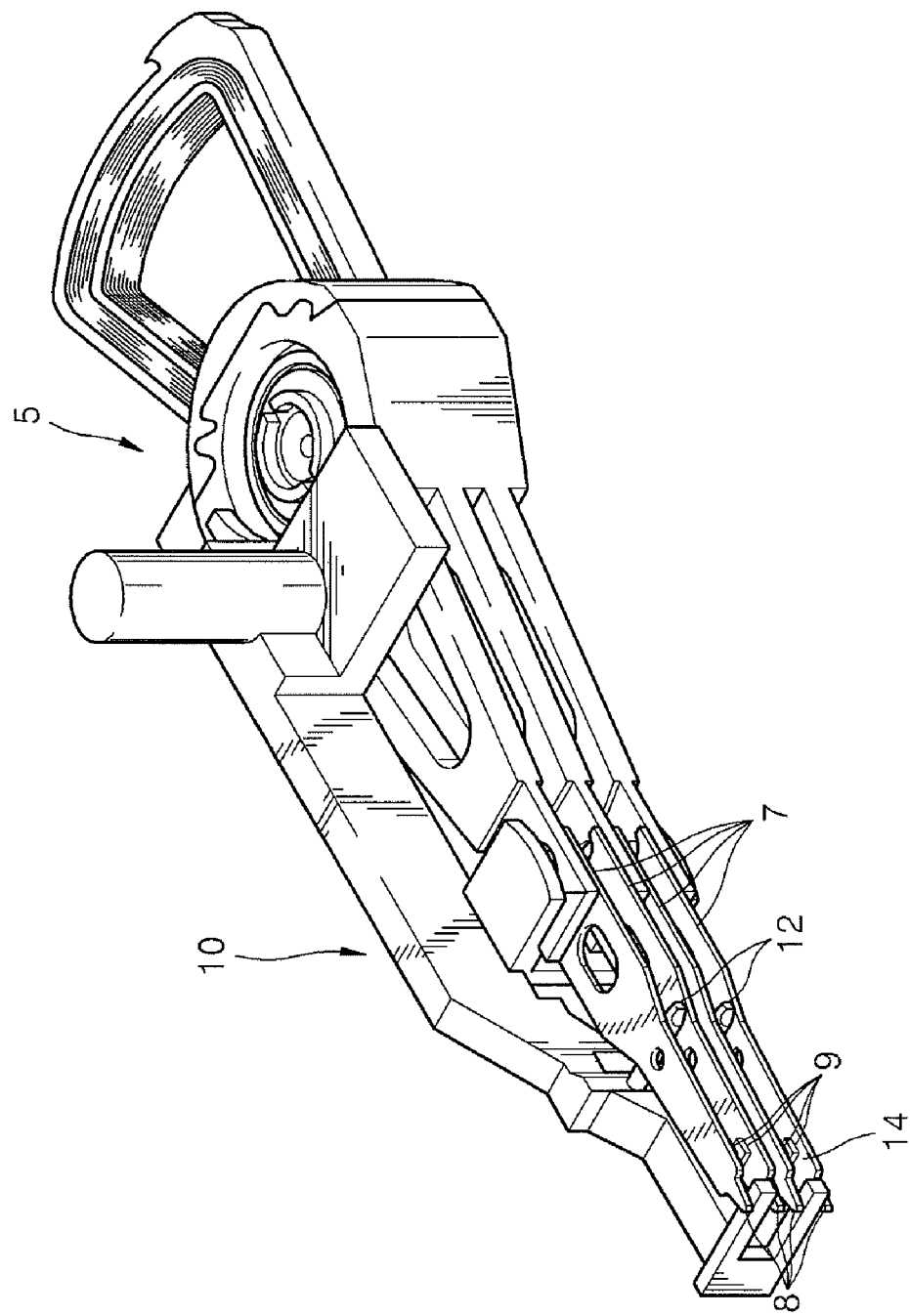
FIG. 1 is a perspective view illustrating a conventional shipping comb and a head stack assembly (HSA) supported by the shipping comb.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
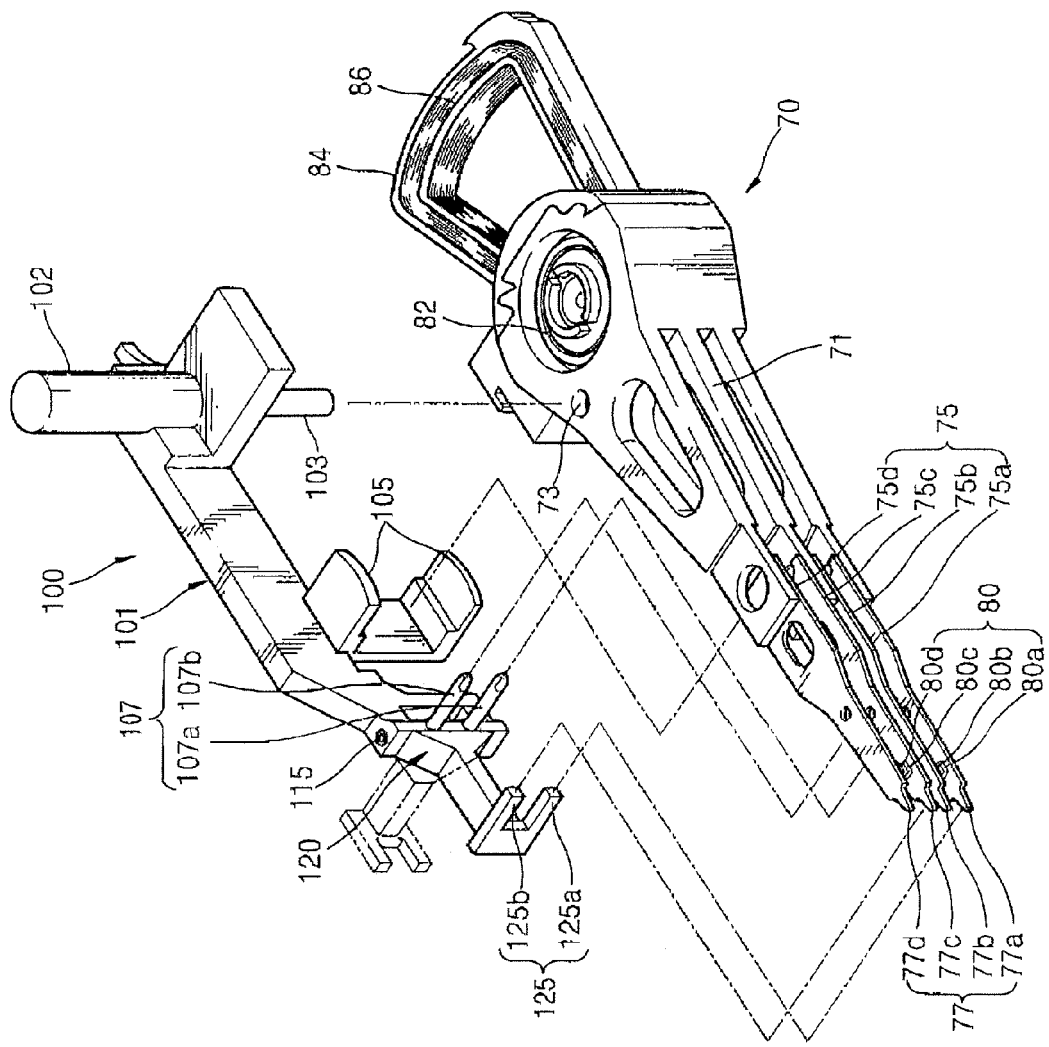
FIG. 2 is a perspective view illustrating a shipping comb and a head stack assembly supported by the shipping comb according to an embodiment of the present general inventive concept.
Figure 3:
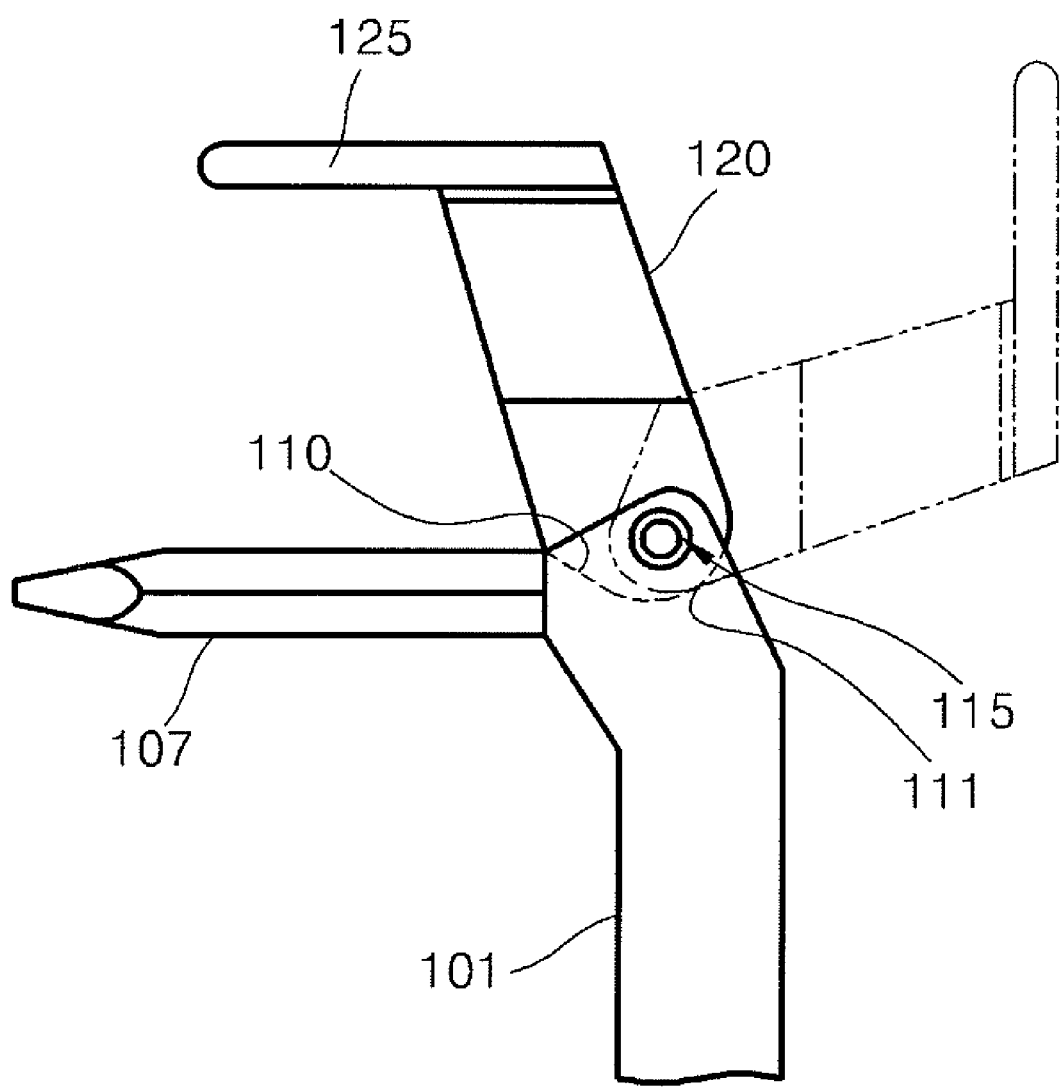
FIG. 3 is a plan view illustrating a portion of the shipping comb of FIG. 2.
Figure 4:
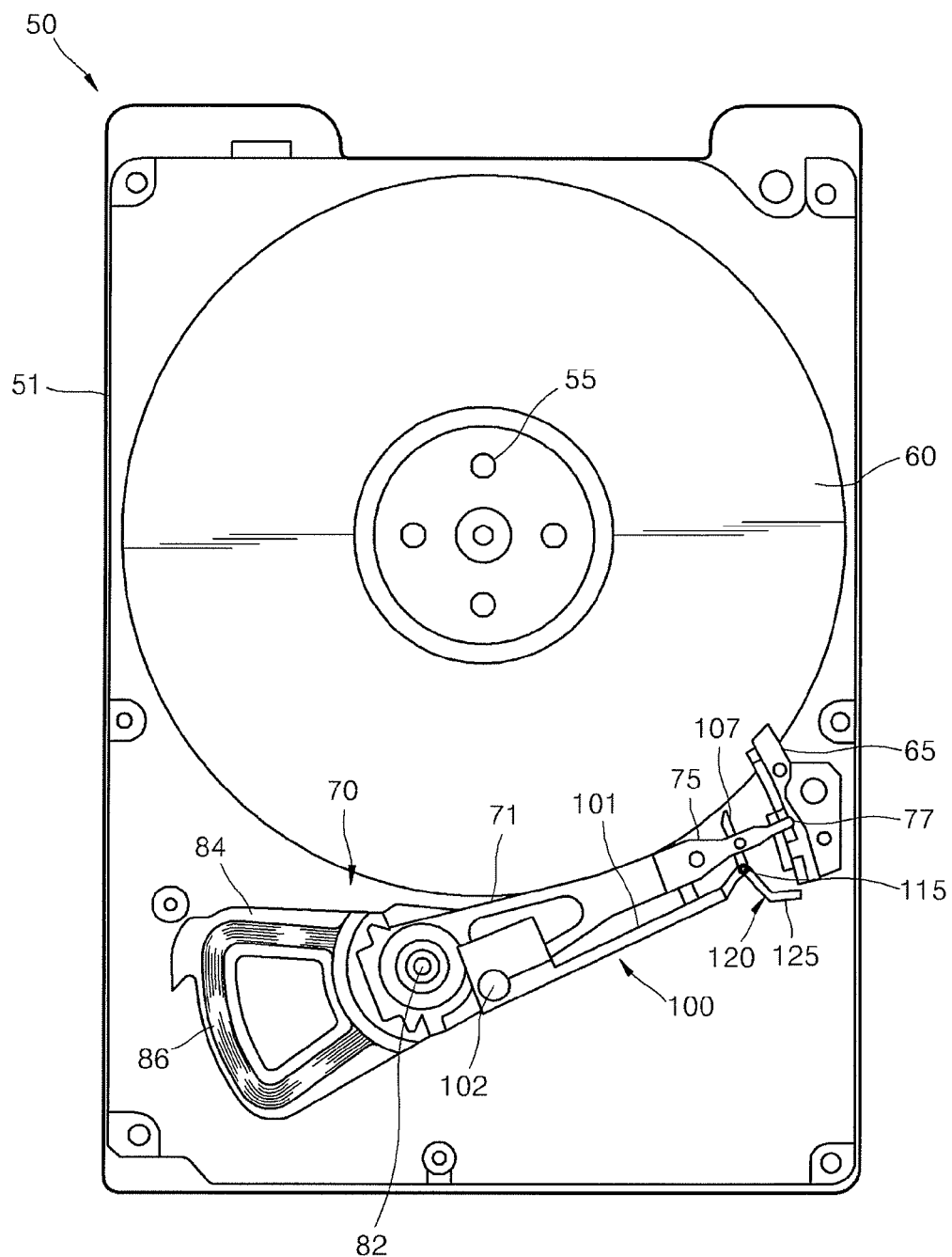
FIG. 4 is a plan view illustrating a process of separating an HSA from a ramp and base member using the shipping comb of FIG. 3.

FIG. 2 is a perspective view illustrating a shipping comb 100 and a head stack assembly (HSA) 70 supported by the shipping comb 100 according to an embodiment of the present general inventive concept. FIG. 3 is a plan view illustrating a portion of the shipping comb 100 of FIG. 2. FIG. 4 is a plan view illustrating a process of separating the HSA 70 from a ramp 65 and a base member 51 of a hard disk drive (HDD) 50 using the shipping comb 100 of FIG. 3.

Referring to FIG. 4, the hard disk drive 50 having the HSA 70 includes a housing having the base member 51 and a cover member (not illustrated) which is connected to the base member 51. The HSA 70, a spindle motor 55, a pair of disks 60, the ramp 65, and a voice coil motor (VCM, not illustrated) to drive the HSA 70 are disposed in the housing.

The spindle motor 55 is installed on the base member 51 to rotate the disks 60. The disks 60 are connected to and rotate with the spindle motor 55, and have data recording surfaces. The pair of the disks 60 is used to store more data. Alternatively, one disk or more than two disks 60 may be used.

The HSA 70 includes magnetic heads (not illustrated) and moves the magnetic heads to predetermined positions above the disks 60 to record data onto the disks 60 or to read data from the disks 60. The HSA 70 includes a swing arm 71, a suspension unit 75 fixed at a front end of the swing arm 71, and a slider unit 80 (see FIG. 2) fixed and supported by a front end of the suspension unit 75. The HSA 70 is connected to the base member 51 to rotate around a pivot 82. A VCM coil 86, which generates a rotational force by interacting with the voice coil motor (not illustrated) to move the HSA 70, is disposed at a back end 84 of the HSA 70.

Referring to FIG. 2, a side of the swing arm 71 has an E-shape, and has four suspensions 75a, 75b, 75c, and 75d at the front end thereof. The suspensions 75a, 75b, 75c, and 75d respectively have sliders 80a, 80b, 80c, and 80d at front ends thereof, and support the sliders 80a, 80b, 80c, and 80d to be elastically biased with respect to the surfaces of the corresponding disks 60. In addition, end-taps 77a, 77b, 77c, and 77d are disposed at the front ends of the suspensions 75a, 75b, 75c and 75d, respectively. The end-taps 77a, 77b, 77c, and 77d are supported by the ramp 65 when the HSA 70 is parked on the ramp 65 (see FIG. 4). The ramp 65 on which the HSA 70 is parked is fixed in the base member 51. Referring back to FIG. 4, when the disks 60 rotate at high speed in the base member 51, the slider unit 80 (see FIG. 2) floats at a height at which a floating force created by the rotation of the disks 60 and an elastic restoring force of the suspension unit 75 toward the disks 60 balance each other. When the slider unit 80 floats, magnetic heads (not illustrated) mounted on the slider unit 80 read data from or record data onto the recording surfaces of the disks 60.

When a stop command is input to the hard disks drive 50, the HSA 70 rotates clockwise, and then the slider unit 80 (see FIG. 2) moves from the recording surface of the disks 60 to the ramp 65. In other words, the slider unit 80 changes from a loading state to an unloading state. On the other hand, when an operation command is input to the hard disks drive 50, the HSA 70 rotates counter-clockwise, and then the slider unit 80 moves from the ramp 65 to the recording surface of the disks 60.

Referring back to FIG. 2, the HSA 70 is combined with a protecting member, that is, a shipping comb 100 that provides storage and carrying support. In this state, the HSA 70 undergoes physical standard measurements and electric function tests. The shipping comb 100 includes a body unit 101 having a handle and a head unit 120 connected to a front end of the body unit 101 with a hinge 115.

The body unit 101 includes a cylindrical inserting protrusion 103 to be inserted into a shipping comb combining hole 73 formed in the HSA 70, a suspension spacer unit 107 having two suspension spacers 107a and 107b protruding near the hinge 115, and a middle supporting unit 105 disposed between the inserting protrusion 103 and the suspension spacer unit 107. The lower suspension spacer 107a is inserted between the middle portions of the lower suspensions 75a and 75b to uniformly maintain a distance between the middle portions of the suspensions 75a and 75b, and to prevent a collision between the middle portions of the suspensions 75a and 75b. The upper suspension spacer 107b is inserted between the middle portions of the upper suspensions 75c and 75d to uniformly maintain the distance between the middle portions of the suspensions 75c and 75d, and to prevent the collision between the middle portions of the suspensions 75c and 75d. The middle supporting unit 105 holds the front end of the swing arm 71 to prevent the swing arm 71 and the suspension 75 from weight deformation.

The head unit 120 includes an end-tap spacer unit 125 having two protruding end-tap spacers 125a and 125b. The lower end-tap spacer 125a is inserted between the lower end-taps 77a and 77b to prevent a collision between the front ends of the suspensions 75a and 75b and between the sliders 80a and 80b. The upper end-tap spacer 125b is inserted between the upper end-taps 77c and 77d to prevent a collision between the suspensions 75c and 75d and between the front ends the sliders 80c and 80d.

Referring to FIGS. 2 and 3, the head unit 120 is connected to the body unit 101 with the hinge 115 so that the head unit 120 rotates with respect to the body unit 101 around the hinge 115 to a predetermined angle from a first position illustrated with a solid line to a second position illustrated with a dotted/dashed line. When the shipping comb 100 is combined with the HSA 70, and the head unit 120 moves to the first position, the end-tap spacers 125a and 125b are inserted into the end-taps 77a, 77b, 77c, and 77d, as described above. On the other hand, when the head unit 120 moves to the second position, the suspension spacers 107a and 107b are inserted between the suspensions 75a, 75b, 75c, and 75d, but the end-tap spacers 125a and 125b are not inserted between the end-taps 77a, 77b, 77c, and 77d.

Referring to FIG. 3, first and second limiters 110 and 111 are provided near the hinge 115 at the front end of the body unit 101 to limit a rotation angle of the head unit 120. A counter-clockwise rotation of the head unit 120 with respect to the body unit 101 is limited by the first limiter 110, and a stop position of the head unit 120 rotated counter-clockwise is the first position. On the other hand, a clockwise rotation of the head unit 120 with respect to the body unit 101 is limited by the second limiter 111, and a stop position of the head unit 120 rotated clockwise is the second position. When the head unit 120 is in the first position and the shipping comb 100 is combined with the HSA 70, the suspension spacer unit 107 and the end-tap spacer unit 125 engage the suspension unit 75 and the end tap unit 77, respectively. When the head unit 120 is moved away from the first position to the second position, the suspension spacer unit 107 and the end-tap spacer unit 125 are moved out of the suspension unit 75 and the end-tap unit 77, respectively.

The head unit 120 should be combined with the body unit 101 with a proper force. That is, the head unit 120 should not be loosely combined with the body unit 101 such that it does not rotate due to little impact or its own weight. In addition, the head unit 120 should not be too tightly combined with the body unit 101 such that the head unit 120 can be rotated by being pushed with a finger. The head unit 120 frictionally contacts the body unit 101 at the hinge 115, so that the head unit 120 can be rotated by being pushed with a finger. A magnitude of a friction force between the head unit 120 and the body unit 101 can be controlled by an assembly force and the conditions of the friction surface.

When a user combines the shipping comb 100 with the HSA 70, the user holds the handle 102 of the shipping comb 100 having the head unit 120 positioned at the first portion, and then inserts the inserting protrusion 103 into the shipping comb combining hole 73 of the HSA 70. Next, the shipping comb 100 is counter-clockwise rotated around the inserting protrusion 103 until the middle supporting unit 105 supports the front end of the swing arm 71 and the suspension spacers 107a and 107b are inserted between the suspensions 75a, 75b, 75c, and 75d, and the end-tap spacers 125a and 125b are inserted between the end-taps 77a, 77b, 77c, and 77d.

When the head unit 120 of the shipping comb 100 combined with the HSA 70 moves to the second position (i.e., away from the suspension unit 75 and the slider unit 80), the sliders 80a, 80b, 80c, and 80d are not screened so that the sliders 80a, 80b, 80c, and 80d can undergo physical standard measurements and electric function tests even though the shipping comb 100 is combined with the HSA 70.

Referring back to FIG. 4, when the hard disk drive 50 is re-worked because the HSA 70 has defects, the head unit 120 is moved to the second position (i.e., away from the suspension unit 75 and the slider unit 80), the inserting protrusion 103 (see FIG. 2) of the shipping comb 100 is inserted into the shipping comb combining hole 73 (see FIG. 2) of the HSA 70, and then the shipping comb 100 is counter-clockwise rotated so that the shipping comb 100 is combined with the HSA 70 regardless of the ramp 65. Accordingly, the HSA 70 can be safely disassembled from the base member 51.

According to embodiments of the present general inventive concept, an HSA can undergo physical standard measurements and electric function tests when a shipping comb is combined with the HSA so that the HSA and sliders mounted in the HSA can be protected from damages during the measurements and tests.

In addition, a defective HSA can be easily re-worked even when the shipping comb is combined with the HSA so that the HSA and sliders mounted in the HSA can be protected from damages during the re-work process.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A shipping comb usable with a head stack assembly (HSA) having sliders recording data onto or reading data from disks, suspensions having the sliders thereon, and end-taps at front ends of the suspensions, wherein the end-taps are closer to the sliders than are middle portions of the suspensions, the shipping comb comprising:

a body unit having protruding suspension spacers which are each inserted between the middle portions of a pair of suspensions having a pair of sliders facing each other to prevent a collision of the middle portions of the pair of suspensions; and a head unit having protruding end-tap spacers inserted between the end-taps of the pair of the suspensions to prevent a collision of the front ends of the pair of suspensions, and connected to a front end of the body unit with a hinge, wherein the head unit rotates around the hinge to a predetermined angle with respect to the body unit so that the head unit reaches a first position where the end-tap spacers are inserted between the end-taps or a second position where the end-tap spacers are not inserted between the end-taps.

2. The shipping comb of claim 1, further comprising: limiters to limit a rotation angle of the head unit with respect to the body unit.

3. The shipping comb of claim 1, further comprising: at least a pair of the suspension spacers and a pair of the end-tap spacers corresponding to the HSA which includes at least two pairs of the suspensions.

4. The shipping comb of claim 1, wherein the head unit frictionally contacts the body unit at the hinge so as not to rotate due to its own weight with respect to the body unit.

5. The shipping comb of claim 1, further comprising:
an inserting portion extending from the body unit in a third direction perpendicular to the first and second directions to be inserted in a shipping comb combining hole of the head stack assembly.

6. A shipping comb usable with a head stack assembly (HSA) having sliders recording data onto or reading data from disks, suspensions having the sliders thereon, and end-taps at front ends of the suspensions, wherein the end-taps are closer to the sliders than are middle portions of the suspensions, the shipping comb comprising:
a body unit having protruding suspension spacers which are each inserted between the middle portions of a pair of suspensions having a pair of sliders facing each other to prevent a collision of the middle portions of the pair of suspensions;
a head unit having protruding end-tap spacers inserted between the end-taps of the pair of the suspensions to prevent a collision of the front ends of the pair of suspensions, and connected to a front end of the body unit with a hinge; and
a middle supporting unit extending from a middle part of the body unit to support a middle part of the head stack assembly, the middle supporting unit having upper and lower support parts extending in the second direction to be positioned on upper and lower sides of the middle part of the head stack assembly.

* * * * *